Dec. 27, 1955
E. C. PICKARD ET AL
2,728,473
CONVEYOR SYSTEM
Filed Jan. 7, 1953
2 Sheets-Sheet 1
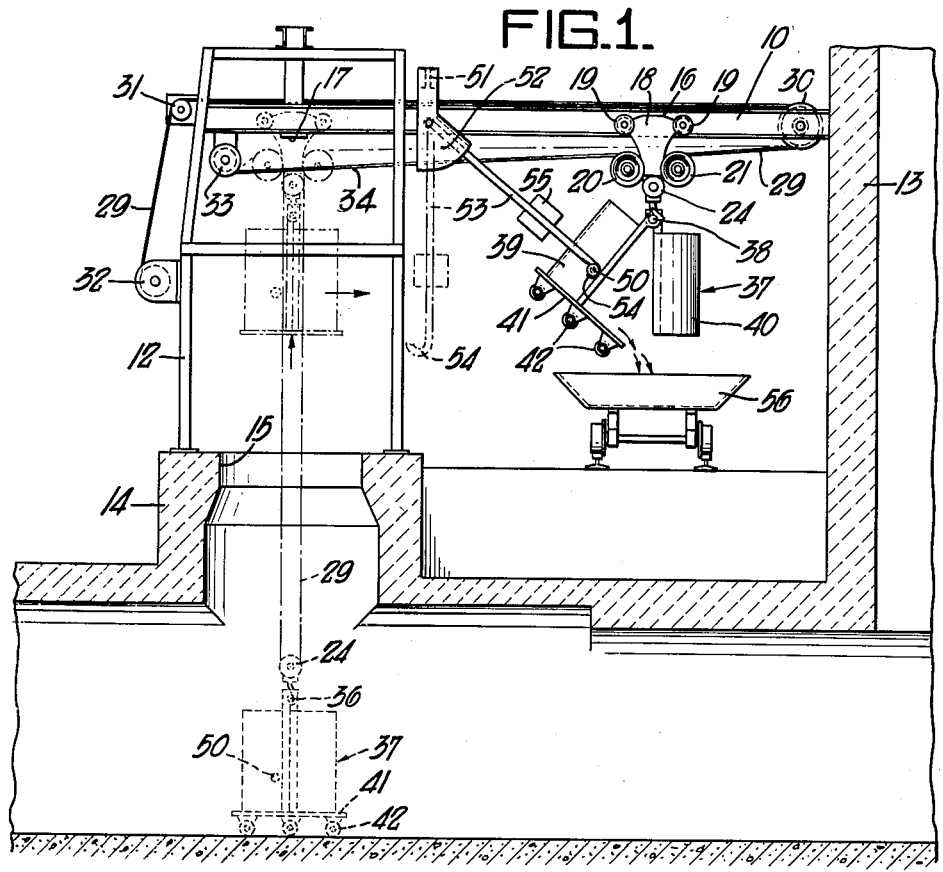
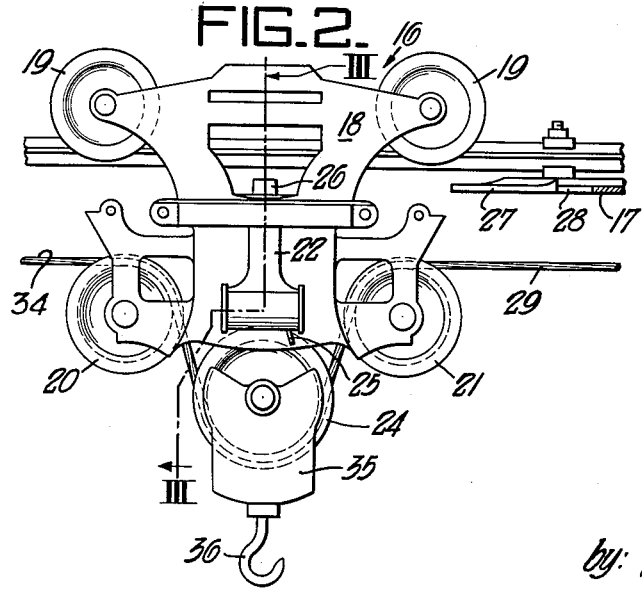
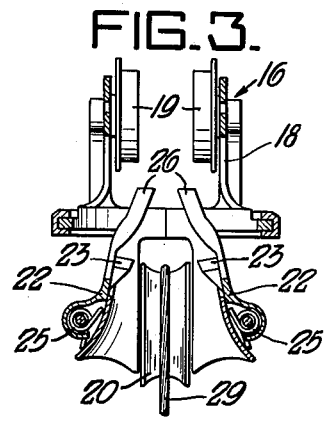
*Inventors:*
EDGAR C. PICKARD and
RICHARD G. WARREN,
by: Donald G. Dalton
their Attorney.

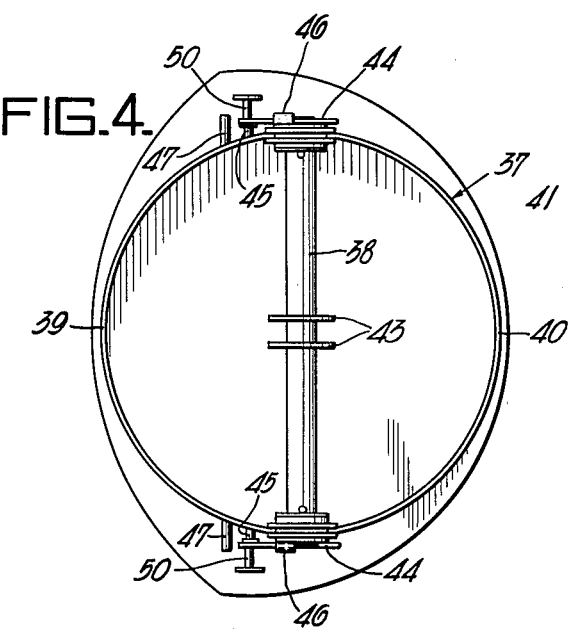

2,728,473
Patented Dec. 27, 1955

2,728,473
CONVEYOR SYSTEM

Edgar C. Pickard, Glenshaw, and Richard G. Warren, Turtle Creek, Pa.

Application January 7, 1953, Serial No. 330,052

4 Claims. (Cl. 214—315)

This invention relates to an improved conveyor system for transporting loose material from a chamber accessible from the top, for example for cleaning purposes.

An object of the invention is to provide an improved conveyor system which is adapted to elevate a load, move the load sideways, and then automatically dump the load.

A more specific object is to provide an improved conveyor system which includes a bucket adapted to be lowered into a chamber for receiving a load, a trolley and boom mechanism adapted to raise the loaded bucket and move it sideways, and means for automatically opening the bucket and thus dumping its load.

A further object is to provide as a subcombination an improved self-dumping bucket which is formed of hingedly connected sections and includes lock means normally holding the sections together but adapted to be tripped for opening the sections and dumping the contents of the bucket.

In accomplishing these and other objects of the invention, we have provided improved details of structure, a preferred form of which is shown in the accompanying drawings, in which:

Figure 1 is a side elevational view of a conveyor system which embodies features of the present invention;

Figure 2 is a side elevational view on a larger scale of the trolley and knocker used in our conveyor system;

Figure 3 is a vertical sectional view taken on line III—III of Figure 2;

Figure 4 is a top plan view on a larger scale than Figure 1 of the self-dumping bucket used in our conveyor system;

Figure 5 is a side elevational view of this bucket;

Figure 6 is a top plan view on a larger scale than Figure 1 of the bucket opening mechanism; and Figure 7 is a side elevational view of the bucket opening mechanism.

The conveyor system of our invention includes a boom 10, one end portion of which is rigidly supported on a frame 12. Preferably the other end is removably mounted on a fixed structure, such as a wall 13. The frame is adapted to rest on a floor 14 and straddle an opening 15 therein for removing material from a chamber beneath. The boom is shown as horizontal, although it is apparent that it can be made sloping if desired. The conveyor is readily portable when the end of the boom is detached from the wall.

The boom carries a trolley 16 movable therealong and a knocker 17 which is fixed to the portion thereof adjacent the frame 12. The trolley and knocker per se are of a known construction, and preferably are similar structurally to devices previously used as hay carriers. Examples of suitable devices for this purpose are shown in Myers Patents No. 727,823, No. 727,824, No. 767,488 and Burkholder Patent No. 795,336. Briefly the trolley illustrated comprises a housing 18, wheels 19 rotatably mounted on said housing and riding on the boom, a pair of pulleys 20 and 21 rotatably mounted on the housing, and a pair of latches 22 pivoted to the sides of the housing. The latches have projections 23 which extend within the housing and are adapted to engage and support a sheave 24. Springs 25 bias the latches inwardly relative to the housing to a position where their projections 23 support the sheave. The upper ends of the latches carry operating levers 26. The end of the knocker 17 is wedge-shaped in plan, as indicated at 27, and the knocker contains a pair of notches 28 behind its wedge-shaped portion. When the trolley moves to a position along the boom where the operating levers 26 engage the wedge-shaped portion 27 of the knocker, the latter spreads the latches and thus releases the sheave 24. Thereafter the operating levers 26 enter the notches 28, which prevent movement of the trolley away from the knocker.

A cable 29 is dead-ended to the pulley 20, extends under the sheave 24, over the pulley 21, around a pulley 30 at the far end of the boom 10, back along the top of the boom, over a pulley 31 at the frame end of the boom, and is wound around a winch 32. The latter is mounted on the outside of the frame 12 and has a suitable power drive not shown. On its inside the frame carries a rotatable spring reel 33. A cable 34 connects this reel with the trolley 16, preferably being joined to the pulley 20. It is seen that this pulley functions merely as an anchorage for the cables 29 and 34, and thus any other device to which these cables could be attached would be equivalent.

The sheave 24 is rotatably mounted in a housing 35 which carries a depending hook 36 or other equivalent attaching means. The hook supports a self-dumping bucket 37. As best shown in Figures 4 and 5, the bucket includes a horizontal handle 38, a pair of semicircular side wall sections 39 and 40 hinged at their upper portions to said handle, and an enlarged bottom member 41 fixed to the side wall section 39 and projecting under the side wall section 40. Preferably the bottom member carries casters or wheels 42 to enable the bucket to be moved around readily when resting on a floor and detached from the hook 36. Preferably the handle 38 carries a pair of spaced apart disk-shaped guides 43, and the hook 36 engages the handle between said guides.

The side wall sections 39 and 40 of the bucket 37 carry a lock mechanism which normally holds them in a closed position. This mechanism includes a bell crank 44 pivoted at 45 to the section 39, a guide 46 and stop pin 47 both fixed to the section 39, and a pin 48 fixed to the other section 40. The stop 47 limits movement of the bell crank in the counterclockwise direction as viewed in Figure 5. The lower arm of the bell crank has a bifurcation 49 which receives the pin 48 when the bell crank is rotated to its clockwise position for holding the wall sections closed, and which releases the pin when the bell crank is rotated to its counterclockwise position for releasing the sections and allowing them to open. The upper arm of the bell crank carries an outwardly projecting trunnion 50. Similar lock mechanism can be applied to the other side of the bucket, if desired, and is shown in Figures 4 and 5.

The boom 10 carries a device which is cooperable with the trunnion 50 for automaticaly tripping the lock mechanism and thus opening the bucket 37. This device includes a transverse horizontal beam 51 fixed to the boom, a fan-shaped guide 52 fixed to the end of this beam, and a bar 53 freely pivoted to said guide. The bar terminates in a hook 54 which extends back toward the frame. When the trolley 16 carries the bucket 37 to the right to a position where the hook 54 engages the trunnion 50, further movement of the trolley and bucket rotates the bell crank 44 counterclockwise and thus opens the bucket. Preferably the bar 53 also carries a bucket guide 55 intermediate its length, the purpose of which is to prevent the bar from hanging up on the lock mechanism when the bucket returns from its dumping position. If the lock mechanism is applied to both sides of the bucket, as illustrated in the drawings, a duplicate release device is provided for the other side.

In operation, assume first that the trolley 16 is positioned on the boom 10 within the frame 12 in engagement with its knocker 17, and that the bucket 37 is lowered through the opening 15, as shown in dotted lines in Figure 1. After the bucket has been loaded, the winch 32 is operated to wind the cable 29. Since the operating levers 26 of the trolley are within the notches 28 of the knocker, the trolley is restrained from moving along the boom and winding of this cable lifts the bucket and its load. The bucket continues to ascend until the sheave 24 engages the projections 23 of the latches 22 and opens them sufficiently that the operating levers 26 ride out of the notches 28. At the same time these projections grasp the sheave and thus support the bucket and load from the trolley, which now is free to move along the boom 10.

Continued winding of the cable 29 on the winch 32 moves the trolley and bucket to the right. Presently the trunnion 50 engages the hook 54 on the bar 53. The bar swings counterclockwise to the limit permitted by the fan-shaped guide 52 and turns the bell crank 44 counterclockwise. This action frees the bifurcated end 49 of the bell crank from the pin 48, as already explained, and thus trips the lock mechanism and opens the bucket. The winch 32 stops when the bucket is open and in its dumping position, as shown in full lines in Figure 1. A suitable receptacle 56 preferably is furnished for receiving the contents of the bucket.

After the bucket has been dumped, the winch 32 is released and allowed to turn freely. The spring reel 33 acts through the cable 34 to return the trolley and bucket to the left. If the boom is made to slope toward the frame, gravity assists this return movement. The two sections of the bucket gravitate to their closed position and the bell crank 44 turns clockwise until its bifurcation 49 again engages the pin 48 and locks the sections together. The trolley continues to move to the left until the operating levers 26 engage the wedge-shaped portion 27 of the knockers 17. The levers act to spread the latches 22 and thus release the sheave 24, whereupon the bucket drops back into the opening 15 to receive another load. The operating levers then return to the notches 28.

From the foregoing description it is seen that our invention affords a simple and readily portable conveyor system for raising a load, moving the load sideways and automatically dumping it. We have found the structure particularly useful for cleaning debris from pits which are not easily accessible, for example, grease pits beneath a rolling mill or open hearth furnace checker chambers. The invention enables the debris to be removed from the pit and dumped in a car at one side all in one operation.

While we have shown and described only a single embodiment of the invention, it is apparent that modifications may arise. Therefore, we do not wish to be limited to the disclosure set forth but only by the scope of the appended claims.

We claim:

1. In a conveyor system which includes a fixed boom, a trolley movably supported on said boom, and means for propelling said trolley along said boom, the combination with said trolley and boom of a bucket suspended from said trolley and a dumping mechanism carried by said boom, said bucket comprising a first section having side walls and an open lower end, a second section hinged at its upper portion to the upper portion of said first section and having side walls and an extended bottom wall for closing the lower ends of both sections, a lock member pivoted to a side wall of said second section adjacent the lower end, means fixed to a side wall of said first section with which said lock member is engageable to lock the sections together, and a trunnion carried by said lock member, said dumping mechanism comprising a depending arm pivoted with respect to said boom, and a hook on said arm adapted to engage said trunnion when said first section passes said arm, engagement of said hook with said trunnion acting both to release said lock mechanism from said first section and to open the bucket.

2. In a conveyor system which includes a fixed boom, a trolley movably supported on said boom, and means for propelling said trolley along said boom, the combination with said trolley and boom of a bucket suspended from said trolley and a mechanism carried by said boom for dumping said bucket when it moves to a predetermined position, said bucket comprising a first section having side walls and an open lower end, a second section hinged at its upper portion to the upper portion of said first section and having side walls and an extended bottom wall for closing the lower ends of both sections, a bell crank pivoted to a side wall of said second section and having a bifurcation, a pin projecting from a side wall of said first section with which said bifurcation is engageable to lock the sections together, and a trunnion carried by said bell crank, said dumping mechanism comprising a depending arm pivoted with respect to said boom, and a hook on said arm directed away from said bucket when the latter is in its predetermined position for dumping, said hook being engageable with said trunnion when said first section passes said arm for turning said bell crank to release said bifurcation from said pin and opening the bucket.

3. A bucket comprising a handle, a pair of upright side wall sections depending from said handle and together forming a continuous enclosure, a bottom wall fixed to one of said sections and extending under the other and thus forming a bottom closure for both sections, a bell crank pivoted to the section which carries the bottom wall and having a bifurcated end, a pin projecting from the other section and adapted to be received within said bifurcated end for holding the sections together, a trunnion projecting from the other end of said bell crank for operating the latter first to disengage its bifurcated end from said pin and next to pull the section which carries the bottom wall away from the other section to dump the bucket while the other section remains upright.

4. A bucket comprising a handle, a pair of upright hingedly related sections depending from said handle and together forming a continuous enclosure, a bottom wall fixed to one section and extending under the other and thus forming a bottom closure for both sections, a bell crank pivoted to the section which carries the bottom wall adjacent the lower end of this section and having a bifurcated end, a pin projecting from the other section and adapted to be received within said bifurcated end for holding the sections together, a trunnion projecting from the other end of said bell crank for operating the latter first to disengage its bifurcated end from said pin and next to apply a lifting force to the section which carries the bottom wall and thereby pull this section away from the other section to dump the bucket while the other section remains upright.

References Cited in the file of this patent

UNITED STATES PATENTS

| | | |
|---|---|---|
| 448,297 | Hulett | Mar. 17, 1891 |
| 727,824 | Myers | May 12, 1903 |
| 795,336 | Burkholder | July 25, 1905 |
| 1,152,472 | Arndt | Sept. 7, 1915 |
| 1,331,423 | Estep | Feb. 7, 1920 |
| 1,608,692 | Boltz | Nov. 30, 1926 |
| 1,867,448 | Durbin | July 12, 1932 |
| 2,082,022 | Murdock | June 1, 1937 |